(12) United States Patent
Junqueira de Souza et al.

(10) Patent No.: US 7,666,057 B2
(45) Date of Patent: Feb. 23, 2010

(54) DEVICE FOR HYGIENIZING, WARMING, AND DEHUMIDIFYING A BEEHIVE

(76) Inventors: Marcio Junqueira de Souza, Av. Jurema 147, ap 202, Sao Paulo-SP-Moema (BR) CEP 04079-000; Marcelo Regattieri Sampaio, Rua Assis Brasil 143, ap 302, Bloco 1, Rio de Janeiro-RJ-Copacabana (BR) CEP 22030-010; Marlo Golin Buzzatti, Rua Leopoldo Miguez 86, ap 201, Rio de Janeiro-RJ-Copacabana (BR) CEP 22060-020

( * ) Notice: Subject to any disclaimer, the term of this patent is extended or adjusted under 35 U.S.C. 154(b) by 301 days.

(21) Appl. No.: 11/798,352

(22) Filed: May 14, 2007

(65) Prior Publication Data
US 2008/0064298 A1    Mar. 13, 2008

(30) Foreign Application Priority Data
Sep. 11, 2006   (BR)  ................................ 0603782

(51) Int. Cl.
*A01K 51/00* (2006.01)
(52) U.S. Cl. ............................... 449/2; 449/12; 449/35
(58) Field of Classification Search .................. 449/2, 449/12, 13, 35
See application file for complete search history.

(56) References Cited

U.S. PATENT DOCUMENTS

| | | | |
|---|---|---|---|
| 2,014,455 A | 9/1935 | Schwab | |
| 2,564,898 A | 8/1951 | Haines | |
| 3,683,432 A | 8/1972 | Musgrove | |
| 3,691,346 A | 9/1972 | Dyre et al. | |
| 3,994,034 A * | 11/1976 | Van Damme et al. | ......... 449/12 |
| 4,877,990 A | 10/1989 | Fiorenzano, Jr. et al. | |
| 5,069,651 A | 12/1991 | Arndt | |
| 5,162,014 A | 11/1992 | Moore et al. | |
| 5,326,543 A | 7/1994 | Fiorenzano, Jr. et al. | |
| 5,874,050 A | 2/1999 | Matias | |
| 6,037,374 A | 3/2000 | Kochansky et al. | |
| 2003/0072688 A1 | 4/2003 | Matias | |

* cited by examiner

*Primary Examiner*—Rob Swiatek
(74) *Attorney, Agent, or Firm*—Sughrue Mion, PLLC

(57) ABSTRACT

A device and associated process for hygienizing and warming beehives aiming at the improvement of the production of organic bee produce, the device being installed in a beebox including an entrance for bees and frames for accommodating bees and bee products, and between the frames, a spacing making available one empty frame for installing the device. The device comprises a ceramic block inserted in the one empty frame provided with at least one row containing from 8 to 32 channels being in the vertical position and where the lower end and the upper end of the channels are opened towards the inner portion of the beehive, the channels being: i) thermally insulated from the rest of the one frame with the aid of wings and ii) traversed by conducting filaments connected to an energy source by a flat wire, whereby the electrical current crossing the filaments makes it possible to attain temperatures inside the channeles between 300-350° C. with ensuing warming of the air circulating in the beehive by convection, the warmed air from the upper ends of the channels creating a negative pressure in the lower ends of same, whereby outer colder air is sucked towards the ceramic channels so as to sustain continuous circulation of air through the channels, with the consequent extermination of the microorganisms present in the air as the microorganisms pass through the warmed channels.

32 Claims, 10 Drawing Sheets

DEVICE FOR HYGIENIZING, WARMING, AND DEHUMIDIFYING A BEEHIVE

FIELD OF THE INVENTION

The present invention relates to the field of the devices for hygienizing, warming and dehumidifying beehives, more specifically, to an electromechanical device for fighting several pathogenic agents that harm those insects such as viruses, fungi, bacteria, mites, mold, spores and mildew, through hygienizing, dehumidifying, and warming the air that circulates in a bee box using mainly air convection so as to provide heat to the bee colony.

BACKGROUND INFORMATION

The concept of employing the thermal effect as a sterilizing agent is generally well-known, as well as is the concept that the Joule effect can be used as a source of heat. Examples of state-of-the-art devices using such effect for cleaning or purifying the air by means of a tubular or elongated passage associated to a heating device can be found in U.S. Pat. Nos. 2,014,455, 2,564,898 and 3,691,346. Such devices require relatively high power input, give out a flow of concentrated air and/or result in an air discharge at a relatively high temperature. Other devices utilize air sterilization with the aid of ultraviolet equipment.

U.S. Pat. No. 4,877,990 describes a device for the sterilization of ambient air using the effect caused by the passage of a continuous air stream through a relatively large number of small diameter, electrically-heated pipes, where the energy is dissipated by means of the Joule effect and where the high thermal gradient as produced within the pipes has an average value of 220° C. so that the protein membrane associated to most of the bacteria and viruses found in air are destroyed. According to the specification of said patent, a refractory block provided with a plurality of high thermal gradient pipes is provided, the pipes being arranged in such a way as to improve the sterilizing action of the Joule effect with consequent rise in the destruction efficiency of air microorganisms without causing any temperature increase in the air of the room where the proposed device is installed.

The basic concept for building the device object of U.S. Pat. No. 4,877,990 derives from thermodynamics, since it involves the convection of gases through a relatively large number of small diameter pipes, placed in close proximity one to the other and vertically aligned, the pipes being heated in the axial direction.

Preferably, each of the pipes is heated by means of a few watts (15-25 W), low-resistance wire placed within the pipe. The block where the pipes are bored is made up of zirconia and silica. It is alleged that the device shows improved efficiency relative to other state-of-the-art devices in terms of the rise in the efficiency of the volume of sterilized air by consumed watt, this being due to the use of high thermal gradient pipes provided with heating devices placed in the axial direction and simplicity in the heating process, since the obtained high efficiency is attained through pipe parameter choice selected according to thermodynamic laws.

The proposed device is useful for ambient sterilization such as homes, hospitals and whenever there are patients suffering from respiratory ailments. The device is able to sterilize 2.5 $m^3$ every hour at an energy consumption of just 25 Wh while other devices need 1.5 Wh for the treatment of the same air volume.

The Joule effect in this system can result from the passage of an electric current through a resistive element such as a NiCr wire placed in the axial direction in pipes designed for profiting from thermodynamic principles. Thus, the pipes and the heating with wires in the axial direction make possible to provide air circulation through the pipes solely by convection.

U.S. Pat. No. 5,326,543 describes a device for sterilizing the air of grain storage silos. According to this document, the useful storage life of cereals or other products can be increased by the reduction of biological activity in the storage ambient. To this end, air is oxidized in a chamber which is external to the ambient. The oxidized air is driven by propulsion from the oxidation chamber up to the storage ambient.

U.S. Pat. No. 5,874,050 describes an improved device which is structured so as to eliminate germs, bacteria, viruses and other microorganisms found in the air of an inner ambient, without substantially increasing the temperature of the room where the device is to be placed. The device is shaped as an elongated member formed in a ceramic material, having a first end and a second end, and a plurality of narrow and substantially parallel passages which extend between said passages in order to allow the passage of the flow of air through the same. The plurality of narrow, substantially parallel passages is sized and spaced relative to one another within the elongate member so as to maximize a ratio of surface area of ceramic material exposed to air and from which heat will be irradiated per volume of ceramic material utilized in the device and also to minimize resistance to heat flow through the ceramic material. The air sterilization device additionally comprises at least one heating wire disposed and extending in the interior of at least one of the narrow, substantially parallel passages. The heating wire is structured and placed so as to irradiate substantial amounts of heat through the ceramic material of the elongated member so as to heat the parallel passages heating the air within the narrow and substantially parallel passages until the air attains a sufficient temperature which makes it sterilized and naturally increase, leaving the elongated member and creating a low pressure in this location and then pulling a fresh air supply towards the interior of the narrow and substantially parallel passages of the elongated member. In another mode of the invention the device for air sterilization comprises a ceramic heating bundle having a plurality of elongated members.

US Published Application 20030072688 describes an improved system for air sterilization to be utilized in refrigerators, multipurpose chambers and compartments where it is desired that the sterilization system does not significantly affect the temperature of the air inside the chamber where it is substantially enclosed.

The system can include a set up entirely placed in an enclosed space or can be connected to the exterior or can have some components in the interior of said space and others out of the space. The system has at least one set up for air sterilization, at least one air entrance and at least one air exhaustion. The entrance and air exhaustion are placed in the interior of the space so that inner air can enter and leave freely the set up for sterilizing air by air convection. Non-sterilized air enters the set up, is cleaned and the sterilized air returns to the space without significantly altering the enclosed space temperature. When utilized in the interior of a refrigeration chamber the device can reduce the development of odors, bacteria, spores and fungi in the enclosed space so as to preserve and enhance the useful life of stored food products and materials.

The device consists of a ceramic core having at least one pipe with at least two longitudinal capillaries extending along the pipe length. The capillary diameter is between 1 mm and 8 mm and the pipe can extend from around 120 mm and 2400 mm length. Capillaries are preferably heated by means of an electrically-resistant wire running throughout the capillary length. The wire is connected to an energy source. When energy crosses the wire, the wire resistance generates heat, which is then irradiated towards the air around the wire in the capillary interior. The resistant wire is designed for producing heat in the interior of the capillary at a temperature higher than 160° C.

Heat present within capillaries causes an air stream towards the vertical sense with heating of the air when the ceramic pipe is in the vertical position. The heated air leaving the upper capillary ends causes a negative pressure in the capillary lower ends, sucking outer air towards the interior of the ceramic capillaries and providing continuous air circulation throughout the capillaries. Microorganisms present in the air are exterminated by heat as they cross the heated capillaries. The flow of continuous air generated by air convection assures substantial air sterilization in an efficient and silent way while keeping energy consumption at low rates. The pipes are made up of ceramic material or any equivalent material, so that temperatures higher than 200° C. are attained. The ceramic nucleus is placed in an outer housing having an air access open at its bottom. An optional heat exchanger can be used at a certain distance above the ceramic capillaries, and can have an impact and heat resistant cover, said cover being provided with at least one air outlet for expelling air outside the device.

Bee culture aiming at the production of honey and related products has a drawback associated to the presence, in the air found in the beehive, of several parasites, such as mites, bacteria, viruses, spores, mold, fungi and mildew, those contributing to lower the bees output.

It is well-known that honey-producing bees (in Latin, *Apis mellifera* L.) are the most helpful insects found in nature. Since thousands of years, they have produced honey, the first sweetener ever known, besides other products such as bee wax, which can be used in cosmetics and for making candles; pollen, which can be used as food, royal jelly which is a very powerful health support product; propolis, and bee venom which are widely used as therapeutic agents for ailments. Still, they pollinate flowers, which may be their most beneficial activity. First rate cultures and large scale farming depend primarily on bee pollination to keep high quality and productivity. Recent studies as of March 2007 indicate that if bees didn't pollinate the crops in the North American farming market, this would result in an approximate US$ 14 billion negative impact to the rural economy.

Bees are social insects living in colonies. There are three castes of bees in each colony, the queen, the drones and the workers. The most important is the queen, acting as an egg factory in the beehive; she lies from 1,500 to 3,000 eggs a day, if the number of workers is sufficient to incubate such eggs. Workers are all female, but practically sterile since they cannot mate. The workers carry out the work of the colony. Work share in the colony is called age polytheism. New workers clean the nest cells during the first 2-3 days then they become nurses and provide food for the immature stages of the three castes. They also take care of the queen, feeding her with royal jelly throughout the day. Still, they take time to build fresh nests using wax secreted by their abdomen glands. They also process the collected nectar by adding enzymes to turn it into honey. In near three weeks of their living span they become apt to the domestic task and are able to collect pollen, water and propolis for several uses in the beehive. The lifespan of the workers is from 3-4 weeks in summer, much less than the queen, which has a lifespan of between 3 and 5 years.

The sole task of the drones is to mate with the new queen; they die during the mating process.

Mites infest the newborn in the beehive (drones and workers). Acariosis develops preferably in a humid environment and low temperature typical of the Brazilian South and Southeast area winter. In these areas and during the colder period, lower honey output also occurs, this being due to the energy expense undergone by the bees in order to keep the beehive temperature, the bees using honey as a maintenance food until the weather turns friendlier.

Bees give the heat required for the beehive heating by moving and vibrating thoracic muscles, consuming honey, the main raw material, in huge amounts, so that the honey output is lowered. When there is excess heat, bees ventilate the beehive with the aid of their wings. In this way, the whole swarm of bees regulates the temperature, keeping it between 34° C. and 37° C., as well as the humidity within the beehive, keeping it around 40%, by means of the homeostatic mechanism, with their activities being coordinated by pheromones.

Chemicals are also used for controlling mites in beehive bees. U.S. Pat. No. 6,037,374 discusses the several available compositions. A drawback is that the reagents that are toxic for the mites can leave residues in honey, besides being usually toxic as well to the bees. Mites can also develop resistance to the reagents. In this way the use of chemical reagents per se is not a suitable method for killing mites.

U.S. Pat. No. 5,069,651 describes an approach using an apparatus connected to the beehive. In this apparatus, a blower at the beehive top is used to heat the air introduced at the beehive bottom. The air temperature is kept at 49° C. up to 54° C. for 15 minutes. Vegetable oil is inserted in the beehive with the aid of the blower in order to ease the killing of mites, probably by blocking the respiratory tract of the mites. However, vegetable oil can harm the bees and their products. Besides, the apparatus is expensive and its use is time-consuming.

U.S. Pat. No. 5,162,014 proposes the use of magnetism for combating mites. This method did not prospered and it is uncertain how the mites are affected by magnetism.

U.S. Pat. No. 3,683,432 relates to heating elements for the foundation of the honeycomb in order to warm the beehive honey intended for feeding the bees during the cold season.

Therefore the open literature discloses on the one hand the existence of ceramic-block based devices, such block being perforated so as to form pipes or channels for the insertion of electrically-resistant wires able to warm and hygienize by convection air circulating in a housing so as to eliminate parasites and molds from the environment and on the other hand, several approaches including heating or warming of portions of a beehive in order that the bees can profit during the cold season from the honey stored in the beehive.

Documents describing air sterilization devices based on perforated ceramic blocks forming channels or pipes where electrically-resistant wires are inserted for heating the air within a housing so as to sterilize several parasites, fungi and molds by air convection do not contemplate the application of this kind of equipment by adapting the geometry of same for a bee frame in order to keep the temperature of a bee box and hygienize it, avoiding that the bees consume any energy to maintain the temperature of said box as well as avoiding the use of any disinfectant chemical product. The open literature also does not contemplate the possibility of a process for the rise in the output of organic bee products with the aid of the device described below in the present specification, the obtained products being free of any added agricultural defensives or reactants. It should be pointed out that the device object of the present invention further provides an energy subsidy as heat in the beehive nest in a power range between 5 Watts and 15 Watts. This spares the bees the task to move the muscles of their wings for the warming of the beehive environment, so that their energy can be directed for producing useful products, with the consequent reduction in the consumption of the basic raw material of their muscle energy, that is, honey.

Furthermore, the inventive device is provided with a temperature detection mechanism made up of thermal switches that actuate independent filaments inside the ceramic block. Once the filaments are activated, air starts to circulate in the beehive by means of the inner convection current and alternatively through forced ventilation.

The device works also to reduce air humidity inside the beehive by evaporating water vapor droplets present in this environment, these droplets being the physical transportation and dissemination agents for fungi, mold, spores, mites and mildew, etc, also called "pathogenic swarms" that attack and withdraw the strength of the main swarm—the bees. In case the bees detect an accentuated reduction in the beehive humidity, they place through their tongues water droplets throughout the beehive so as to increase and regulate the humidity of the environment.

In this "swarm war" occurring inside the beehive, the device of the invention favors the bee-swarm versus the pathogenic swarms cited above. As is well-known from the bee-related literature, the strengthened bee swarm has better defenses against all the aggressive outer and inner agents, once the working force of the bees is increased through a better task distribution and specialization.

The present device is further provided with two mechanisms for reducing accumulated humidity within the bee box present in the heated air inside the ceramic block. The first of these mechanisms is an opening between the upper portion of the nest box cover and the vertical wall of the box. This aperture or opening is positioned at the upper corner of the box where the warm air accumulates and gets trapped due to its lower density relative to the remaining air. The aperture can be created by sliding the said cover so as to create a minimum passage for the humid warm to move outside of the beehive. Alternatively, round orifices can be perforated in the said cover followed by introduction of rubber tubes such as those used for the passage of drones in commercial pollen collectors.

The second mechanism involves a metallic or glass plate within the nest box which is placed in the vertical wall of the opposite side of the inventive device, at the highest portion of this wall, where the warm and humid air will condensate when it contacts said plate. The plate extends out of the box laterally or to the back side, so as to remain at a lower temperature than the air within the beehive, and this difference of temperatures results in the air condensation. Once the vapor condensates into water droplets, the bees can remove this excessive humidity by licking it away with their tongues.

No matter which humidity reduction method is used, it is up to the bees the humidity fine tuning and control by blocking or freeing any box openings with wax and propolis, regulating temperature and humidity and using biological control of humidity through forced ventilation made by their wings.

By reducing humidity inside the beehive, two further favorable results are obtained: 1—the preservation of the wood used to make the beehive, resulting from lower inner humidity, increasing its useful life, with lower depreciation of the bee business assets; 2—increased honey dehumidification rate, honey being at first deposited by bees in the production honeycombs as green honey, of excessively high relative humidity for collection and human consumption (if prematurely collected, honey can ferment and turn sour). As a result from the action of the inventive device for reducing humidity in the beehive, the drying time of honey is reduced, with honey being more quickly collected and more quickly freeing box frames for further collections. In this way, the harvest cycle is optimized with acceleration of the honey drying period and ultimately significant increase in the amount of honey collected after each flowering, a critical factor for the short term flowering.

The inventive device as disclosed in the present specification is patentably distinguished from state-of-the-art devices since it contains items adapted to the bees' environment, taking into consideration the bees' natural behavior. As is widely known from the specialized literature, bees use to isolate any foreign body inside the beehive, filling in the holes as well as the external material with wax and propolis. Considering such behavior, the upper and lower portions of the present device are provided with a grid having an alternate voltage applied between its conductors in an alternate form, causing a stimulus or minimal electrical discomfort in the bees upon walking on the grid so that the bees are hindered from depositing propolis on it.

The inventive device also contemplates the optimization of the inter-frames inner convection current circulation by adding a slope in the horizontal positioning of the beehive nest between 2 and 15 degrees so as to facilitate air circulation. Warm air leaving the upper portion of the inventive device ascends towards the opposite upper corner of the nest box, gradually descending as it crosses the other frames, conveying sterilized (hygienized) air towards the air pouches between each frame. The beehive entrance, which is placed diametrically opposite the device object of the invention, makes possible to admit cold air from outside the bee box, and because this air is heavier than the inside air, it is displaced in the box bottom towards the lower portion of the present device and is sucked by it.

The inventive device is mounted on a standard bee feeding frame (Langstroth, Schirmer, Curtinaz and others). Such frame has sidewalls that hinder excessive heat from the ceramic block to reach the adjacent frame this being due to it being made from insulating material such as agglomerated wood including insulating matter such mica and the like.

Alternatively, the frame can be made up of neutral, non-toxic plastic such as polyethylene, polypropylene and the like. The frame (see item 5a in FIG. 2) of the inventive device is provided with standard electrical wire for electrical power supply and the wire is directed to the outer portion of the beehive box by means of a flat wire. The flattening is required in order that the cover of the nest box can be closed covering all apertures and thus avoiding heat loss to the environment.

The electrical energy powering circuit contacts of the present device can alternatively be made by metallic contacts installed in the bottom side of the support edges of the bee feeding frame. The electrical energy supplying wire can be embedded or carved inside the beehive wood box in the location which supports the feeding frame when it is inserted into the box, so that the device groove is similar to the plug-and-play system of computer electronic cards, making it easy to install and operate. Therefore, when placing the device grove in the bee box within its working position, the electric contacts between the grove and the bee box are established through overlaying physical contact, and the electrical circuits of the grove are supplied with electrical current.

The inner portion of the inventive device, that is, where the ceramic block itself is placed, is provided with air ducts (see items 15a and 15b of FIG. 6) which guide, direct, and optimize the flow of air throughout the device, isolating said duct of air flow from the remaining electrical, electronic, and mechanical constituents from the inventive set up, thus reducing the air flow friction.

An additional advantage of the present device is that since it provides strong and healthy bee swarms at any season, the bee boxes containing it are adequately used for pollinate fruit cultures and other agricultural produce at a higher yield than it is possible to obtain from state-of-the-art bee boxes.

It should be pointed out that although the present device backs the bee swarm in three critical variables for its good development, that is, air purification, temperature and humidity, it is the bees which are in charge of the homeostatic fine tuning; it is up to them to take the necessary steps for the optimization of these variables.

From the documents of the open literature it can be seen that there is no description nor suggestion of a device for warming the ambient of a bee box and hygienizing or purifying the air inside said box, the device being installed in a frame of said box and comprising a perforated ceramic block forming at least one row of channels, said channels being provided of a lower end and an upper end opened to the beehive interior, electrically-resistant wires being inserted in the interior of said channels and connected to an energy source, so that when electrical current goes through said wires air is warmed, the warmed air from the upper portions of the channels creating a negative pressure at the lower ends of the channels, causing sucking of outer air towards the interior of the ceramic channels and supporting a continuous air circulation throughout the channels with the consequent extermination of the microorganisms present in the air as those are conveyed throughout the warmed channels, such device being described and claimed in the present application.

SUMMARY OF THE INVENTION

Broadly, device 30 of the invention for hygienizing and warming a beehive comprises:

a) providing a bee box 1 including bee entrance 4 for entrance of bees and frames 5 for accommodating bees and bee products, and between said frames 5, spacing 6*b* and in said box 1, make available one empty frame 5*a* for installing said device 30;

b) inserting in said frame 5*a* a ceramic block 11 provided with at least one row containing from 8 to 32 channels 11*a*, said channels being preferably arranged in two rows of 4 to 16 channels, said channels 11*a* being vertical and where the lower end and the upper end of same are opened towards the interior of the beehive, the channels being thermally insulated from the remaining of the frame 5*a* with the aid of wings 15*a*,15*b* and traversed by electrically conducting filaments 14*a*,14*b* connected to an energy source 20 through a flat wire 7, whereby the electrical current crossing said filaments 14*a*,14*b* makes possible to attain temperatures inside said channels 11*a* between 300-350° C. with ensuing warming of the air circulating in the beehive by convection, the warmed air from the upper ends of channels 11*a* creating a negative pressure in the lower ends of same, whereby the colder outer air is sucked towards the ceramic channels 11*a* so as to sustain continuous circulation of air through said channels, alternatively with the aid of a fan or air pump 21, with the consequent extermination of the microorganisms present in the air as said microorganisms pass through warmed channels 11*a*.

Temperature control is performed with the aid of thermostats and alternatively added of a timer and humidity sensors.

And the process for optimizing the production of organic bee produce with the aid of the device of the invention comprises providing the present device in a frame inserted in a bee box, plugging the said device to an energy source in order to provide electric energy to the wires included in the said device, letting the same run for the period required for optimizing the production of said bee produce, and collecting organic bee produce in amounts that are higher than the amounts possible to be collected using state-of-the-art processes.

Thus, the invention provides a device for hygienizing and warming air in a bee box which makes possible the optimization of organic bee produce during the cold season as well as during the whole year.

The invention also provides a process for the optimization of organic bee produce with the aid of the inventive device.

The invention provides additionally a device and associated process for hygienizing and warming air in a bee box which makes possible to pollinate agricultural cultures at improved yield in agricultural produce in any season relative to state-of-the-art bee boxes.

The invention provides further a device and associated process making possible to obtain organic bee produce in higher amount and of better quality than those that can be obtained from state-of-the-art devices and processes.

BRIEF DESCRIPTION OF THE DRAWINGS

FIG. 10 attached shows the electric and electronic circuit of the inventive device. FIG. 10A shows the circuit relative to the warming of the ceramic pipe wires, while

DETAILED DESCRIPTION OF THE INVENTION

Figure 1:
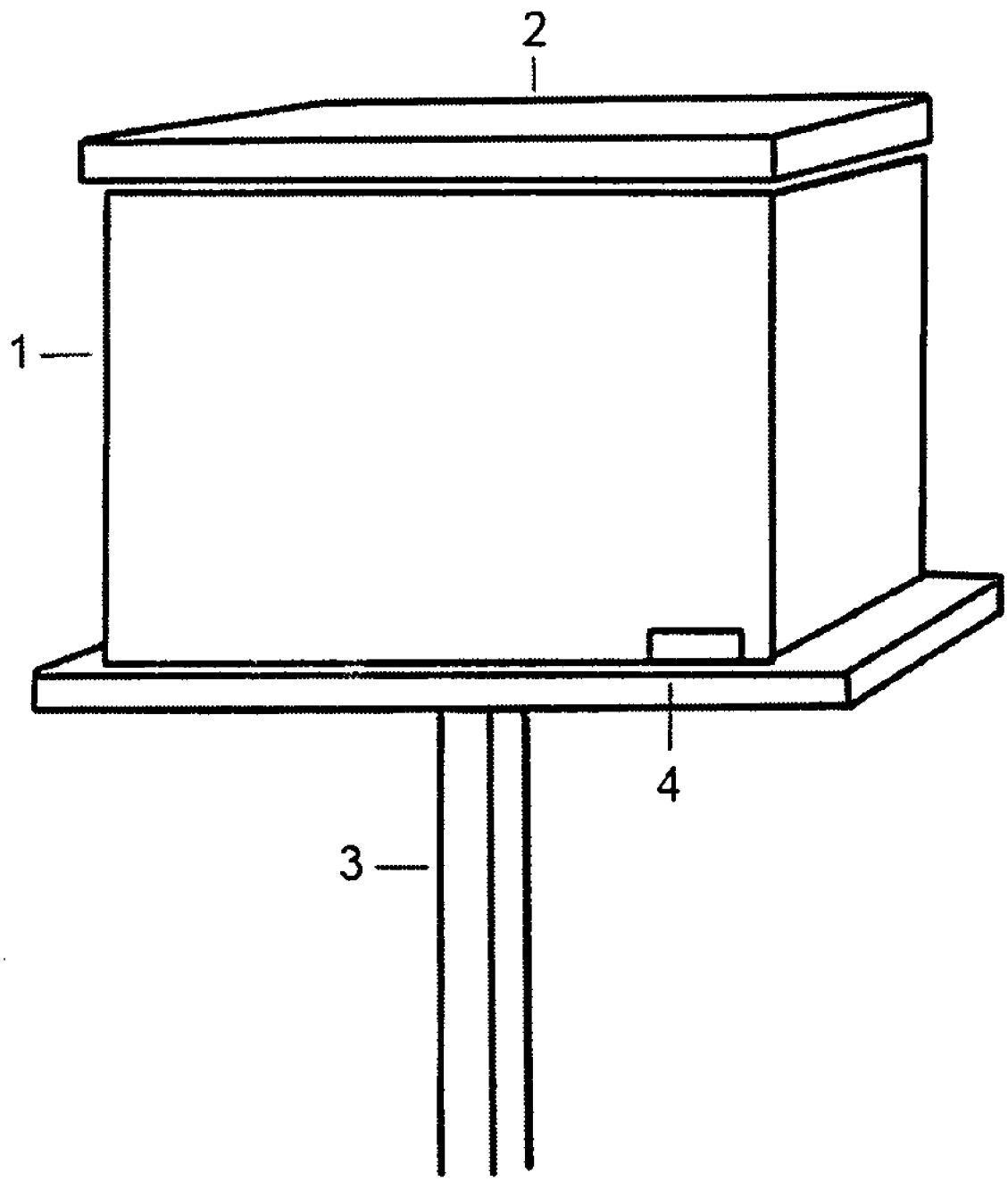
FIG. 1 attached is a schematic illustration of a bee box where a device according to the invention is to be inserted.

One aspect of the invention is a device for the optimization of organic bee produce.

Another aspect of the invention is a process for optimization of organic bee produce with the aid of the inventive device.

Still another aspect is that the device and process of the invention, since they keep the bees of a bee box in a healthy state throughout the whole year, lead to increased yields in the pollination of agricultural cultures relative to state-of-the-art bee boxes, that is, those from which the present device is absent.

The inventive device is applicable to all the usual kinds of bee boxes, or nest boxes such as Langstroth, Schirmer and Curtinaz, as such or adapted in any way.

Organic bee produce of improved yield obtained from the insertion of the inventive device in a bee box include honey, propolis (conventional and green), royal jelly, wax, pollen, bee venom and any similar related bee produce.

The present invention has been developed based on the principle of air sterilization/hygienizing inside a bee box so as to keep optimum temperature conditions in said box in any season, as well as to eliminate mite, fungi and mold that reduce the bee population, the final result being the optimization of organic bee produce throughout the year, and chiefly during the cold season.

As explained above, the inventive device to be installed in a frame of a bee box comprises inserting in the central portion of said frame a ceramic block provided with at least one row of channels containing from 8 to 32 channels, more preferably being arranged in two rows of 4 to 16 channels, the channels being vertically positioned and having lower and upper ends opened towards the inner portion of the beehive, said channels being thermally insulated from the remaining of the frame and crossed by electrically resistant wires plugged to an energy source, whereby, whenever electrical current crosses said wires, there is air warming, the warmed air from the upper ends of the channels creating a negative pressure at the lower ends of same, the outer air being sucked towards the interior of the ceramic channels so as to support a continuous air circulation by convection through the channels, or alternatively through forced ventilation with the aid of a fan or an air pump, the microorganisms present in the air being exterminated as they cross the warmed channels, the temperature being controlled with the aid of thermostats and alternatively using a timer and humidity sensors.

Ceramic channels are made up of ceramic material such as zirconia and silica. The inner diameter of same is between 1 and 4 mm. The number of channels is not critical and can vary between 8 and 32, more preferably from 4 to 16. The height of the ceramic channels should be between 5 and 9 cm.

The positioning of the block within the frame should be in the middle of the frame towards the bottom in the vertical direction, and from the middle of the frame to one of the corners in the horizontal direction so as to optimize/allow air circulation and the conditioning of the remaining components within the frame.

The electrically resistant wire or filament that crosses the ceramic channels is generally a NiCr wire. The wire is plugged to an energy source. The energy source is any, conventional, photovoltaic, wind power, inner or outer batteries or other.

When actuated, the filament provides a temperature level inside the channel of the order of 300-350° C., so that the air in convection crossing the interior of the channels is sterilized/hygienized by the breaking of the protein membrane of the microorganisms such as mites and any parasites, fungi or mold. At the same time, the channel thermal insulation prevents excess temperature near the bees, the working temperature being kept close to the ideal range, around 36° C.

One mode of the invention contemplates the beehive placed in a slope, so as to make easier the convection process.

Another mode of the invention includes air forced ventilation.

The invention will now be described in detail by reference to the attached Figures. It should be understood by the experts that several modifications and variations of the invention can be made in the Figures, all these modifications and variations being comprised in the scope of the present invention.

FIG. 1 illustrates a rational or Langstroth nest box for bee culture, where the inventive device 30 is inserted. Numeral 1 is the box itself, numeral 2 is the box upper cover, the cover 2 being removed by the bee technician during manipulation of the beehive. Box 1 has a support 3 and a bee entrance 4.

Figure 2:
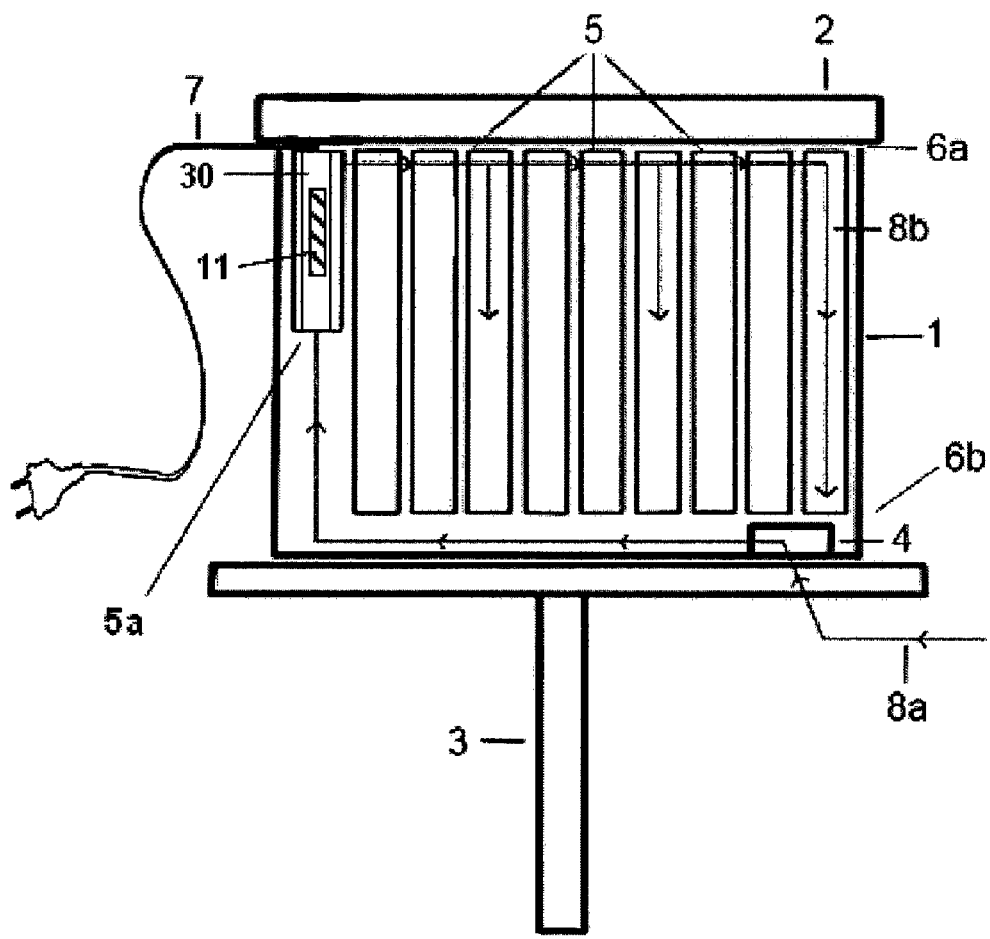
FIG. 2 attached illustrates one mode of the invention where a view of the bee box of FIG. 1 shows the device of the invention inserted inside said box.

FIG. 2 illustrates again bee box 1, support 3, and upper cover 2. Frames 5 can also be seen, those being designed for the specific bees' activities, young bees, eggs, pollen and honey. Frame 5a placed left in FIG. 2, shown as a hatched block is the frame to contain device 30. Between cover 2 and box 1 there is spacing 6a, while 6b is the spacing between the bottom and frames 5; it is possible to observe in spacing 6a a flat electrical wire 7 for conveying electrical current to device 30.

Through beehive entrance 4, cold air enters via 8a, traversing the bottom of box 1 since it is colder than the air contained within box 1, until said cold air is sucked by the lower portion of device 30, is warmed and warm air leaves via 8b upwards in device 30 expanding through remaining frames 5 and going towards the bottom of box 1 through spacing 6b between frames 5, resulting in a flow of circulating air within box 1. Such circulatory flow conveys pathogenic agents floating in the air towards the interior of device 30 so that such harmful agents can be eliminated.

Figure 3:
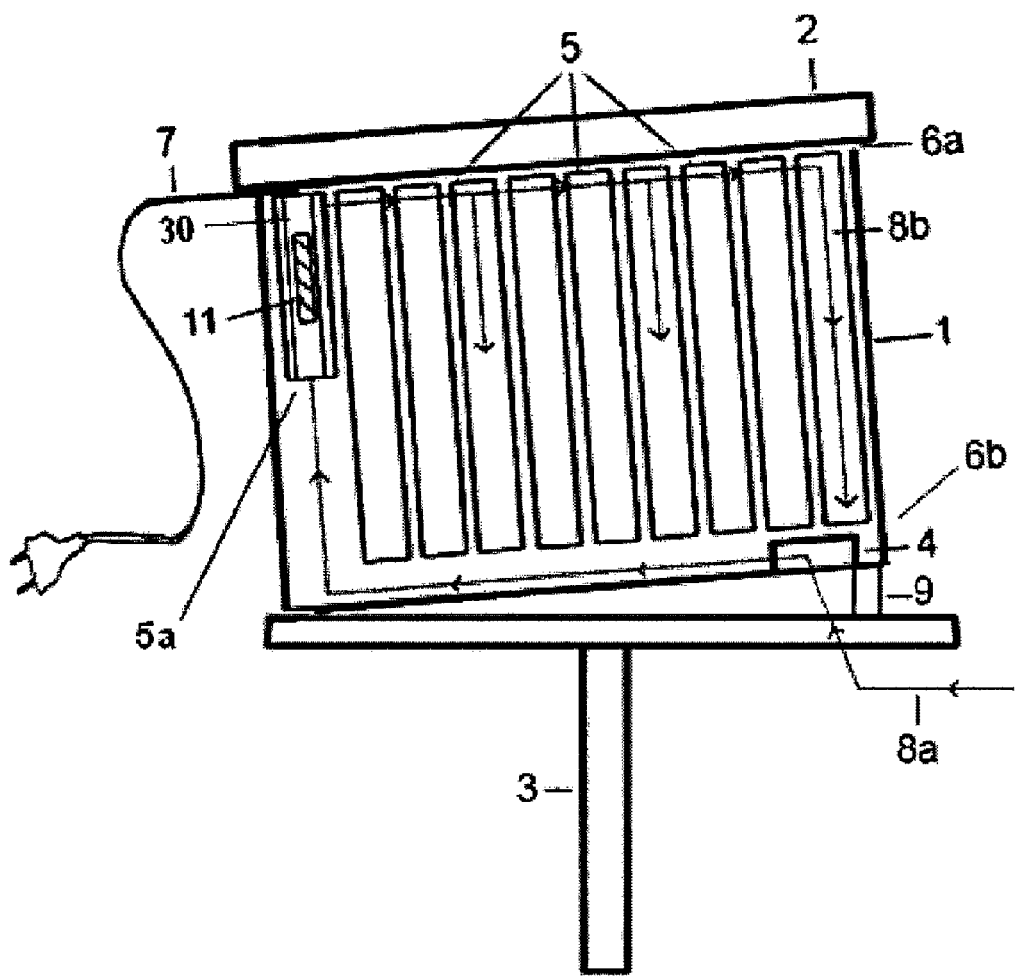
FIG. 3 attached illustrates another mode of the invention as a view, where the box has a 2 to 15 degrees slope relative to the horizontal.

FIG. 3 shows clearly bee box 1, support 3, upper cover 2 box 1 being placed in a slope of 2 to 15 degrees with the aid of a block 9 introduced below the corner of box 1. Frames 5 designed for bee culture activity such as for housing youngs, eggs, pollen and honey can also be seen. The left frame in FIG. 3, 5a, has the same meaning as in FIG. 2, as well as the items designed by 6a, 6b, 7, 8a and 8b.

According to the mode of FIG. 3 it is possible to demonstrate the optimization of air circulation within box 1 since when cold air enters via 8a through entrance 4, such air relies on gravity to be displaced towards the lower left corner of box 1, where air is sucked towards the interior of device 30.

Warm air leaving device 30 via 8b being lighter than the remaining air in box 1 is displaced towards the upper location of same, going towards the upper right corner of box 1, or alternatively is driven towards this direction by means of forced ventilation with the aid of a fan or air pump (not shown).

Figure 4:
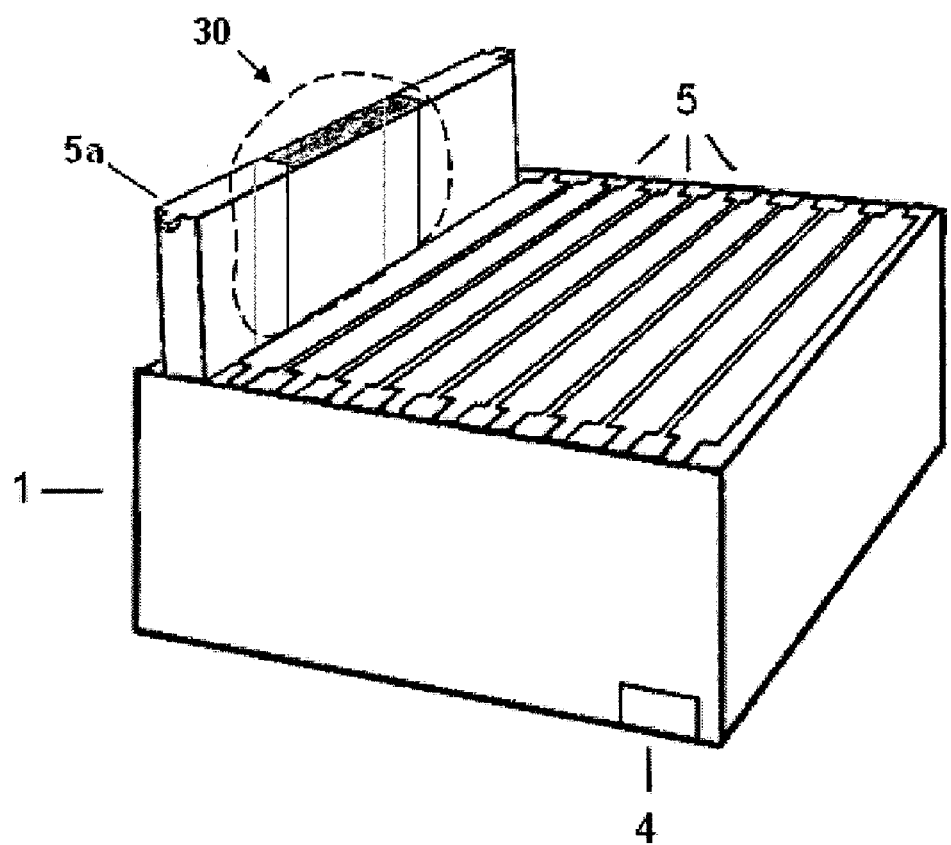
FIG. 4 attached illustrates the frame where the inventive device is inserted, said device being introduced by sliding through the upper portion of the box and up to its working position.

FIG. 4 shows again box 1, entrance 4, further frames 5 directed for the bees' activities only, frame 5a containing device 30 of the invention which is introduced by sliding through the upper portion of box 1 up to its working position.

Figure 5:
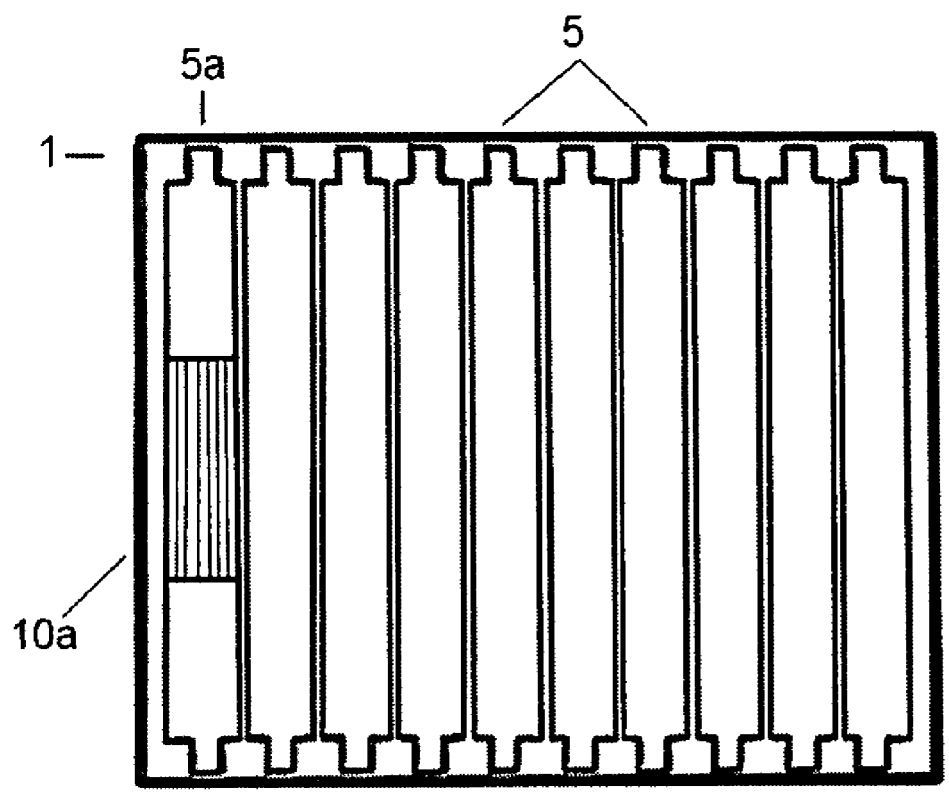
FIG. 5 attached shows an upper view of the frame of the inventive device inserted in the bee box.

FIG. 5 is an upper view of frame 5a containing device 30 inserted in box 1, remaining frames 5 directed for bees' activities, the position of frame 5a containing device 30 and metal grating 10a which hinders the bees' entrance.

Figure 6:
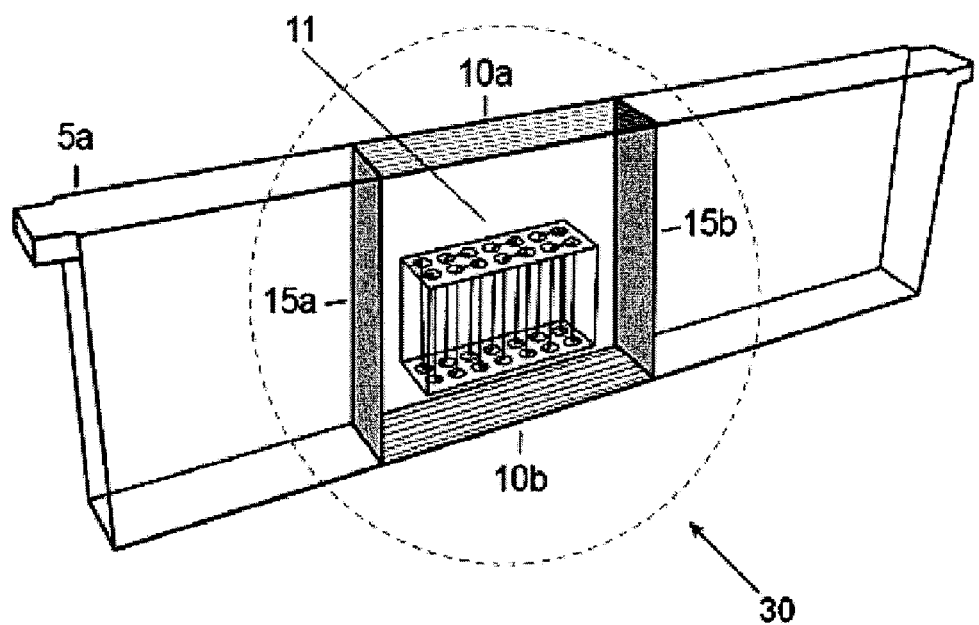
FIG. 6 attached illustrates the space arrangement of the ceramic bloc within the frame of the inventive device.

FIG. 6 schematically illustrates the spatial configuration of ceramic block 11 inside frame 5a containing device 30 of the invention. Insulating wings 15a, 15b are made up of agglomerated material added of any non-toxic material. Alternatively, device 30 of the invention is contained in a frame 5a entirely made up of non-toxic insulating material, including mica, without being limited to it.

Approximate dimensions of ceramic block 11 are 6.5 cm height, 6.0 cm length and 2.8 cm width for a Langstroth beehive model. Said block has from 8 to 32 cylindrical channels 11a each having 3 mm diameter, the channels being arranged in two rows of 4 to 16 channels each. Block 11 should be positioned inside frame 5a from the middle of the frame towards the bottom, and from the middle of the frame towards one of the horizontal corners so as to optimize/allow air circulation and conditioning of the additional components in the frame.

Still in FIG. 6 it can be seen that in the upper portion of frame 5a containing device 30 of the invention is embedded an excluding grating 10a made up of electrical conducting elements spaced apart from nearly 4 mm. The same is true for lower grating 10b. The purpose of excluding gratings 10a, 10b is to prevent that bees try to block device 30 upper and lower portions with propolis, with the consequent interruption of air flow trespassing channels 11a of ceramic block 11.

Figure 7:
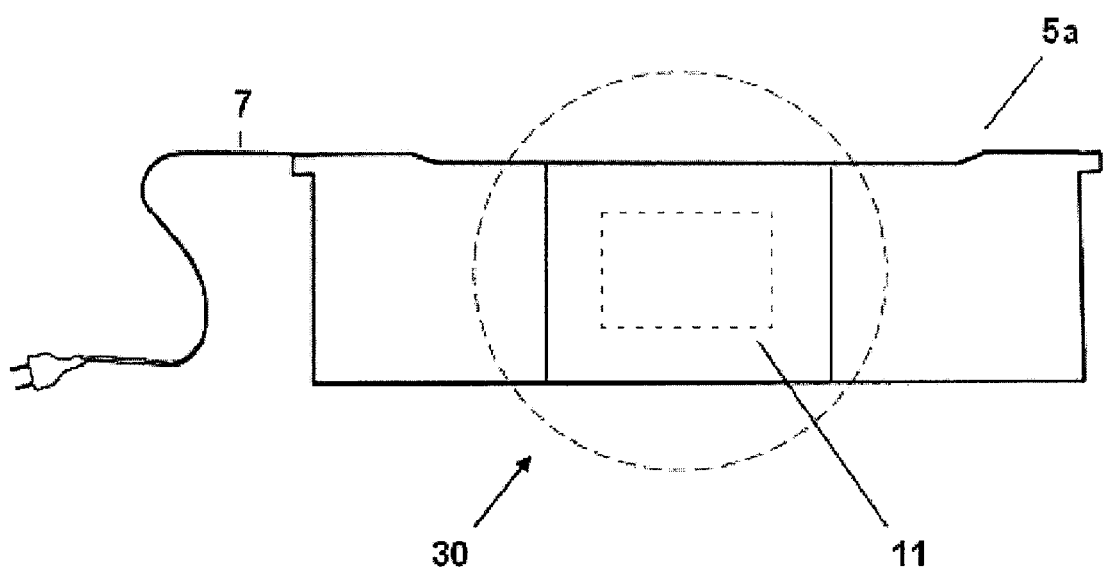
FIG. 7 attached shows a side view of the frame of the inventive device pointing out the flat electric energy cable exiting the device.

FIG. 7 is a side view of frame 5a containing device 30 of the invention, pointing out flat energy cable 7. The flattening of said cable is required in order that cover 2 of box 1 is appropriately closed blocking any apertures in said box and therefore avoiding heat loss for the environment.

Figure 8:
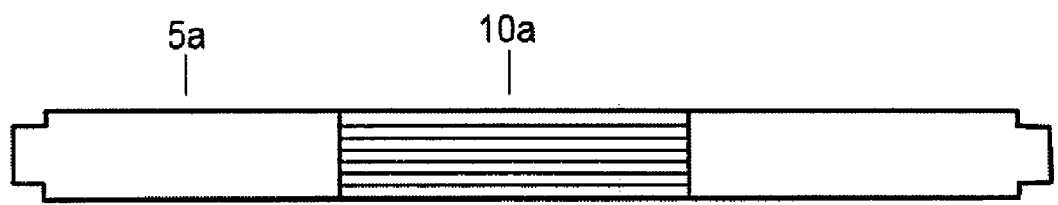
FIG. 8 attached illustrates an upper view of the inventive device frame and of the grating that prevents the bees from entering the ceramic block and allows warm air to exit from the upper and inner beehive portion.

FIG. 8 is an upper view of frame 5a containing device 30 of the invention showing exit 8b of warm, hygienized air, excluding grating 10a to hinder bees' entrance in channels 11a of ceramic block 11.

Figure 9:
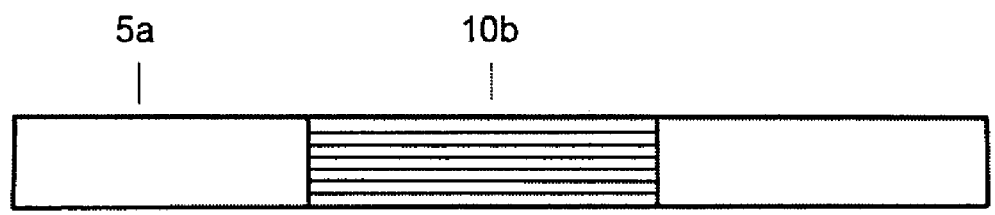
FIG. 9 attached illustrates a lower view of the inventive device frame and of the grating that prevents the bees from entering the ceramic block and allows cold air entrance from the lower and inner beehive portion.

FIG. 9 is a lower view of frame 5a containing device 30 of the invention showing entrance of non-hygienized cold air via 8a and excluding grating 10b to hinder bees' entrance in channels 11b of ceramic block 11.

FIG. 10 shows the electrical and electronic circuitry of device 30.

Figure 10A:
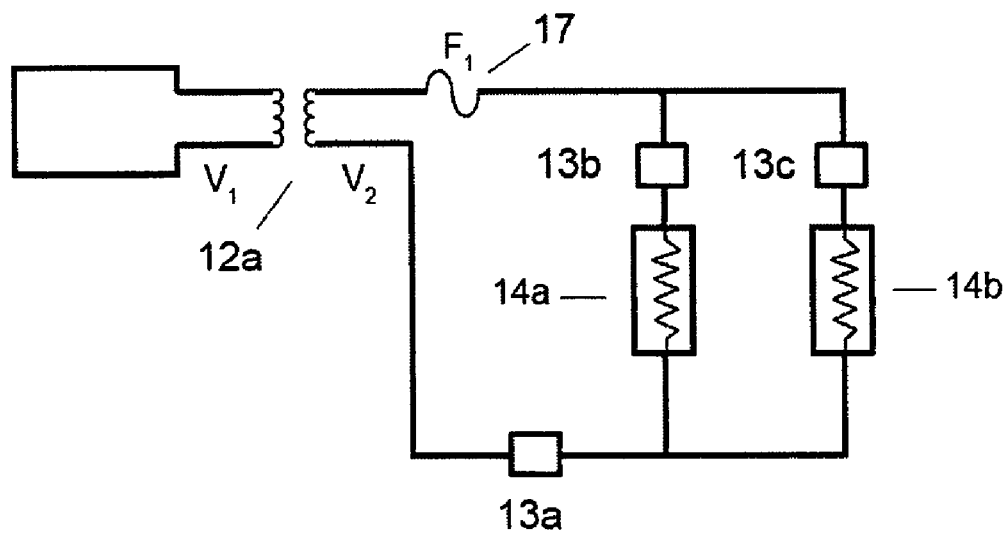

In FIG. 10A, numeral 12a refers to a tension reducing transformer where V1 and V2 are the tensions in the primary and the secondary coils, respectively. Low alternate tension is applied to electrical resistances 14a, 14b of wires or filaments 14 crossing channels 11a of ceramic block 11. The Figure shows also a fuse 17 protecting electrical filaments or resistances 14a, 14b in case there is excess current. Thermal keys are indicated as 13a, 13b, and 13c. Alternatively one single transformer can be used with two secondary coils.

Figure 10B:
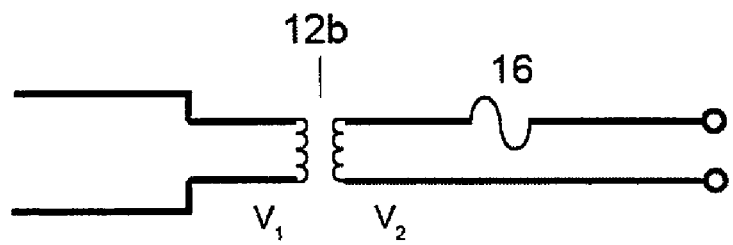
FIG. 10B shows the circuit for energizing the gratings/electrical conductors that prevent bees from entering the inventive device.

FIG. 10B shows the second transformer 12b for feeding the electrical circuit including upper excluding grating 10a and lower excluding grating 10b. This circuit keeps opened, generating a small electrical tension between the conducing elements, which upon being touched by the bees, close the circuit causing small electrical unease to the bees so that they keep apart from it. These conducting elements are electrically connected sequentially alternating phase and neutral. This circuit is also protected by a fuse 16.

Figure 11:
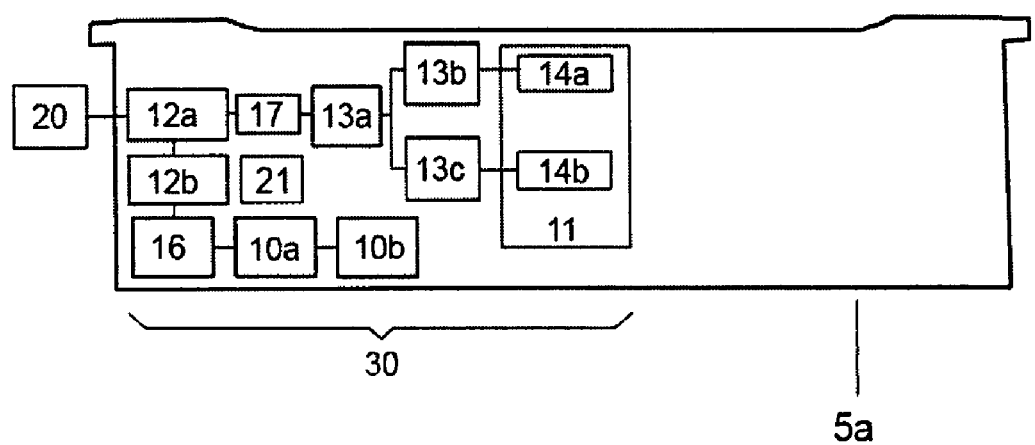
FIG. 11 attached is a schematic block diagram showing a systemic view of the invention.

FIG. 11 is a systemic view of device 30 as a block diagram. Device 30 is fed by an outer energy source 20 which traverses two tension reducing transformers 12a, 12b. The first, 12a, feeds said electrical heating filaments 14a, 14b crossing ceramic block 11, a conventional fuse 17 and a conventional inner thermal key 13a in frame 5a above the ceramic block 11 for controlling the temperature of warmed air leaving said block via 8b.

Alternatively frame 5a containing device 30 contains inner batteries (not shown) that can be either locally or periodically charged by withdrawing frame 5a.

Optionally, use can be made of a fan or air pump 21 in order to aid in air circulation and also for controlling humidity in the beehive.

Alternatively, energy source 20 is a solar energy source, a DC battery source or a wind energy source.

Inner thermal key 13a of frame 5a regulates exit air temperature in the approximate range temperature of 50° C.

Outer thermal keys 13b, 13c operate at different opening temperatures. The first, 13b, opens when the ambient temperature out of box 1 exceeds 24° C., and the second, 13c, when outer temperature exceeds 34° C. When outer temperature is below 24° C., electrical resistances 14a, 14b are fully actuated and device 30 works at full power of approximately 15 Watts. In the temperature range between 24° C. and 34° C., one of the circuits of electrical filaments 14a, 14b is interrupted, and device 30 operates at half power. Whenever the outer temperature is above 34° C., in order to avoid overheating inside box 1 both circuits of filaments 14a, 14b are interrupted and device 30 stops circulating air by heating.

According to one mode of the invention, device 30 is implemented in the half-frame option represented in the attached Figures.

According to an alternative mode, device 30 is implemented in the full-frame option, the frame size in the vertical direction being the same as those of the other adjacent, production frames illustrated in the attached Figures.

We claim:

1. A device for hygienizing, warming and dehumidifying beehives, for the production of improved organic bee produce, said device being installed in a bee box including an entrance for bees and frames for accommodating bees and bee products, and between said frames, a spacing making available one empty frame for installing said device, wherein said device comprises:

a ceramic block inserted in said one empty frame, said ceramic block provided with at least one row containing from 8 to 32 channels, said channels being in the vertical position and where the lower end and the upper end of said channels are opened towards the inner portion of the beehive, said channels being: i) thermally insulated from the rest of said one frame with the aid of wings and ii) traversed by conducting filaments connected to an energy source by a flat wire, whereby the electrical current crossing said filaments makes it possible to attain temperatures inside said channels between 300-350° C. with ensuing warming of the air circulating in the beehive by convection, the warmed air from the upper ends of said channels creating a negative pressure in the lower ends of same, whereby outer colder air is sucked towards the said ceramic channels so as to sustain continuous circulation of air through said channels, with the consequent extermination of microorganisms present in the air as said microorganisms pass through said warmed channels.

2. A device according to claim 1, wherein the organic bee produce comprises honey, conventional and/or green propolis, royal jelly, wax, pollen, bee venom and any similar related produce.

3. A device according to claim 1, wherein said box is a Langstroth, Schirmer, or Curtinaz box.

4. A device according to claim 1, wherein the exterminated microorganisms comprise fungi, mold, bacteria, viruses, mites, spores and mildew.

5. A device according to claim 1, wherein the box is situated horizontally.

6. A device according to claim 1, wherein the box is placed at a slope of 2 to 15 degrees, said slope being obtained with the aid of a block introduced below the corner of the said box.

7. A device according to claim 1, wherein said device is used according to a half-frame configuration.

8. A device according to claim 1, wherein said device is used according to a full-frame configuration.

9. A device according to claim 1, wherein cold air enters the beehive entrance traversing the bottom of said box since it is colder than the air contained within said box until said cold air is sucked by the lower portion of said device, is warmed and leaves upwards in said device, expanding through the remaining frames and going towards the bottom of said box through the spacing between frames, resulting in a flow of circulating air throughout said box, which conveys pathogenic agents floating in the air towards the interior of the device so that such harmful agents can be eliminated.

10. A device according to claim 1, wherein said wings are made up of agglomerated materials and insulating, non-toxic substances including mica.

11. A device according to claim 10, wherein thermal insulation of said channels of said ceramic block makes it possible to keep the beehive at the bees' ideal working temperature, around 37° C.

12. A device according to claim 1, wherein the said frame to house the device is entirely made up of an insulating non toxic material including mica.

13. A device according to claim 1, wherein an inner thermal switch of said frame regulates the temperature of exiting air in the range of approximately 50° C.

14. A device according to claim 1, wherein an outer thermal switch of said frame is opened whenever the outer temperature exceeds 24° C., whereas a second thermal switch is opened when the outer temperature exceeds 34° C.

15. A device according to claim 1, wherein for an outer temperature lower than 24° C. two of said electrical filaments are fully actuated so that the device works at full power of approximately 15 Watts.

16. A device according to claim 1, wherein in the temperature range between 24° C. and 34° C. a circuit formed by said electrical filaments is interrupted, and the working of the device works at half power.

17. A device according to claim 16, wherein said circuit is additionally protected by a fuse.

18. A device according to claim 1, wherein for outer temperatures above 34° C., in order to avoid overheating of the interior of the bee box two circuits of electrical filaments are interrupted as well as air circulation by heating.

19. A device according to claim 1, wherein a step-down voltage converter applies a low tension AC voltage to said electrical filaments crossing said channels of the said ceramic block.

20. A device according to claim 1, wherein alternatively the temperature of heated channels is further controlled with the aid of a timer.

21. A device according to claim 1, further comprises excluding grids supplied with AC voltage applied between conducting components, the voltage being provided by a transformer kept in open configuration so as to generate a small electrical voltage between said conducting components which upon being touched by the bees, cause the bees a slight discomfort and consequently keep them apart.

22. A device according to claim 1, wherein the electrical current is supplied by an electrical power supply.

23. A device according to claim 1, wherein the electrical current is supplied by wind power.

24. A device according to claim 1, wherein the electrical current is supplied by solar power.

25. A device according to claim 1, wherein the electrical current is supplied by an outer battery.

26. A device according to claim 1, wherein the electrical current is supplied by an inner battery.

27. A device according to claim 1, wherein it makes possible the improved pollination of agricultural cultures in any season, relative to state-of-the-art devices.

28. A device according to claim 1, wherein said channels are arranged in two rows of 4 to 16 channels.

29. A device according to claim 1, wherein outer air is provided by a fan or air pump.

30. A process for the optimization of the production of organic bee produce, wherein said process comprises:
   a) providing a bee box having frames for producing bee produce and a free frame to house a device for hygienizing, warming and dehumidifying a beehive according to claim 1;
   b) supplying a bee swarm in said bee box;
   c) plugging the said device to an energy source in order to provide electric energy to wires included in the said device;
   d) allowing the bees installed in said bee box containing said hygienizing, warming and dehumidifying device to make organic bee produce; and
   e) after the period of time required for production, recovering said organic bee produce in quantity and quality higher than is possible to obtain by state-of-the-art processes for producing such produce.

31. A process according to claim 30, wherein said organic bee produce comprises honey, conventional and/or green propolis, royal jelly, bee venom and related produce.

32. A process according to claim 30, wherein it improves agricultural pollination in any season relative to state-of-the-art processes.

* * * * *